US009684758B2

(12) United States Patent
Allen (10) Patent No.: US 9,684,758 B2
(45) Date of Patent: Jun. 20, 2017

(54) GENERATING ASSERTED SENSITIVITIES FOR STATISTICAL TIMING

(71) Applicant: International Business Machines Corporation, Armonk, NY (US)

(72) Inventor: Robert J. Allen, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/452,817

(22) Filed: Aug. 6, 2014

(65) Prior Publication Data

US 2016/0042112 A1     Feb. 11, 2016

(51) Int. Cl.
*G06F 17/50* (2006.01)
*G01R 31/28* (2006.01)

(52) U.S. Cl.
CPC ...... *G06F 17/5081* (2013.01); *G06F 17/5031* (2013.01); *G06F 17/5059* (2013.01); *G06F 2217/84* (2013.01)

(58) Field of Classification Search
CPC ............. G06F 17/5031; G06F 17/5059; G06F 17/5081; G06F 2217/84; G01R 31/28
USPC ................... 716/108, 113, 134, 136; 703/16; 714/732, 735
See application file for complete search history.

(56) References Cited

U.S. PATENT DOCUMENTS

| 3,769,621 | A  | * | 10/1973 | Osborne | .......... | G01R 31/31852 |
| | | | | | | 708/130 |
| 7,487,486 | B2 | * | 2/2009 | Celik | .................. | G06F 17/5031 |
| | | | | | | 703/2 |
| 2008/0072198 | A1 | * | 3/2008 | Celik | .................. | G06F 17/5031 |
| | | | | | | 716/108 |
| 2010/0211922 | A1 | * | 8/2010 | Sinha | .................. | G06F 17/5031 |
| | | | | | | 716/108 |

OTHER PUBLICATIONS

Bhanji et al., "A Hierarchical Transistor and Gate Level Statistical Timing Flow for Microprocessor Designs", provided on Post Disclosure dated Feb. 17, 2014.
Brashear et al., "Predicting Circuit Performance Using Circuit-level Statistical Timing Analysis", IEEE, European Design and Test Conference, Feb. 28-Mar. 3,1994, pp. 332-337, 1066-1409/94, Copyright 1994 IEEE, DOI: 10.1109/EDTC.1994.326856.

(Continued)

*Primary Examiner* — Phallaka Kik
(74) *Attorney, Agent, or Firm* — Isaac J. Gooshaw; Adolph C. Bohnstedt (57) ABSTRACT

One or more processors group a plurality of timing arcs into a plurality of equivalence classes. Each timing arc includes one or more delay tables. One or more processors generate, for at least one equivalence class of the plurality of equivalence classes, an average sensitivity to a condition by performing a weighted average on respective sensitivities of timing arcs to the condition. One or more processors determine a sensitivity of an electronic circuit to the condition based, at least in part, a match between one or more attributes of the electronic circuit and one or more attributes present in the at least one equivalence class.

20 Claims, 5 Drawing Sheets

(56) References Cited

OTHER PUBLICATIONS

Felt, et al., "Hierarchical Statistical Characterization of Mixed-Signal Circuits Using Behavioral Modeling", Computer-Aided Design, ICCAD '96, Digest of Technical Papers, IEEE/ACM International Conference, Nov. 10-14, 1996, pp. 374-380, 1063-6757/96, Copyright 1996 IEEE, DOI: 10.1109/ICCAD.1996.569824.
Guthaus et al., "Gate Sizing Using Incremental Parameterized Statistical Timing Analysis", Computer-Aided Design, ICCAD '05, IEEE/ACM International Conference, Nov. 6-10, 2005, pp. 1029-1036, DOI: 10.1109/ICCAD.2005.1560213.
Tang et al., "RDE-Based Transistor-Level Gate Simulation for Statistical Static Timing Analysis", Design Automation Conference, DAC '10, Jun. 13-18, 2010, 47th ACM/IEEE, pp. 787-792.
Visweswariah et al., "First-Order Incremental Block-Based Statistical Timing Analysis", IEEE Transactions on Computer-Aided Design of Integrated Circuits and Systems, vol. 25, No. 10, Oct. 2006, pp. 2170-2180, 0278-0070, Copyright 2006 IEEE.

\* cited by examiner

```
library (library_name) {
 delay_model : table_lookup;

time_unit : "1ps";
 voltage_unit : "1V";
 current_unit : "1mA";
 capacitive_load_unit(1, ff);

input_threshold_pct_rise : 50;
 input_threshold_pct_fall : 50;
 output_threshold_pct_rise : 50;
 output_threshold_pct_fall : 50;
 slew_upper_threshold_pct_rise : 80;
 slew_lower_threshold_pct_rise : 20;
 slew_upper_threshold_pct_fall : 80;
 slew_lower_threshold_pct_fall : 20;
 slew_derate_from_library : 0.75;

lu_table_template (delay_slew_load_8x8) {
 variable_1 : input_net_transition;
 index_1 ("1, 2, 3, 4, 5, 6, 7, 8");
 variable_2 : total_output_net_capacitance;
 index_2 ("1, 2, 3, 4, 5, 6, 7, 8");
 } cell (INVERT_XYZ) {
 pin (A) {
  direction : input;
  rise_capacitance : 0.815;
  fall_capacitance : 0.810;
  capacitance : 0.813;
  max_transition : 400.000;
 }
 pin (Y) {
  direction : output;
  function : "(!A)";
  min_capacitance : .1;
  max_capacitance : 111.016;
  timing() {
   related_pin : "A";
   timing_sense : negative_unate;
   timing_type : combinational;
   cell_fall (delay_slew_load_8x8) {
    index_1 ("1.000, 5.000, 10.000, 20.000, 40.000, 80.000, 160.000, 400.000");
    index_2 ("1.000, 2.103, 3.482, 6.239, 11.753, 22.783, 44.841, 111.016");
    values ( \
    "3.351, 4.965, 6.977, 10.948, 18.873, 34.781, 66.547, 161.726", \
    "4.399, 6.140, 8.165, 12.160, 20.139, 35.973, 67.900, 162.664", \
    "5.335, 7.400, 9.615, 13.708, 21.648, 37.519, 69.204, 164.564", \
    "6.542, 9.168, 11.906, 16.519, 24.824, 40.680, 72.258, 167.626", \
    "7.982, 11.394, 14.918, 20.771, 30.290, 47.040, 78.782, 173.628", \
    "9.565, 14.052, 18.620, 26.192, 38.391, 57.957, 91.409, 186.574", \
    "10.800, 16.779, 22.809, 32.841, 48.668, 73.634, 112.918, 212.286", \
    "10.826, 19.255, 27.824, 42.275, 65.136, 100.821, 155.900, 277.940" \
    );
   }
 }
```

FIG. 2

```
fall_transition (delay_slew_load_8x8) {
 index_1 ("1.000, 5.000, 10.000, 20.000, 40.000, 80.000, 160.000, 400.000");
 index_2 ("1.000, 2.103, 3.482, 6.239, 11.753, 22.783, 44.841, 111.016");
 values ( \
  "4.128, 7.147, 10.958, 18.573, 33.690, 64.081, 124.825, 307.628", \
  "4.728, 7.478, 11.099, 18.577, 33.834, 64.145, 124.986, 307.183", \
  "5.953, 8.609, 11.942, 19.018, 33.903, 63.988, 124.740, 306.936", \
  "8.114, 11.001, 14.354, 21.019, 34.818, 64.325, 124.753, 307.335", \
  "11.679, 15.182, 19.042, 25.890, 38.948, 66.639, 125.469, 306.923", \
  "17.716, 22.181, 26.770, 34.784, 48.699, 75.203, 130.037, 307.659", \
  "27.888, 33.799, 39.836, 49.802, 66.308, 94.608, 147.537, 314.179", \
  "52.780, 62.119, 71.416, 86.097, 108.770, 144.468, 205.293, 364.849" \
  );
 }
cell_rise (delay_slew_load_8x8) {
 index_1 ("1.000, 5.000, 10.000, 20.000, 40.000, 80.000, 160.000, 400.000");
 index_2 ("1.000, 2.103, 3.482, 6.239, 11.753, 22.783, 44.841, 111.016");
 values ( \
  "3.796, 5.851, 8.368, 13.398, 23.419, 43.506, 83.612, 203.999", \
  "4.932, 7.046, 9.584, 14.632, 24.673, 44.793, 84.809, 204.644", \
  "6.083, 8.452, 11.147, 16.201, 26.249, 46.306, 86.325, 206.497", \
  "7.736, 10.655, 13.758, 19.241, 29.409, 49.451, 89.548, 209.791", \
  "10.138, 13.809, 17.682, 24.320, 35.421, 55.896, 95.849, 216.105", \
  "13.550, 18.283, 23.231, 31.523, 45.274, 67.886, 108.839, 228.791", \
  "18.571, 24.761, 31.097, 41.695, 59.147, 86.978, 132.733, 254.406", \
  "29.290, 38.147, 47.396, 62.536, 86.536, 125.065, 185.881, 327.028" \
  );
 }
rise_transition (delay_slew_load_8x8) {
 index_1 ("1.000, 5.000, 10.000, 20.000, 40.000, 80.000, 160.000, 400.000");
 index_2 ("1.000, 2.103, 3.482, 6.239, 11.753, 22.783, 44.841, 111.016");
 values ( \
  "5.134, 9.070, 13.939, 23.833, 43.494, 82.505, 160.985, 396.413", \
  "5.549, 9.203, 14.041, 23.706, 43.394, 82.600, 161.496, 396.637", \
  "6.656, 10.138, 14.612, 23.943, 43.196, 82.404, 161.485, 395.989", \
  "8.745, 12.353, 16.710, 25.424, 44.004, 82.544, 161.439, 396.357", \
  "12.183, 16.346, 21.046, 29.834, 47.300, 83.982, 160.343, 394.835", \
  "17.831, 22.967, 28.449, 38.428, 56.177, 90.777, 163.132, 395.767", \
  "27.124, 33.921, 40.703, 52.413, 72.979, 108.310, 178.133, 398.929", \
  "49.756, 59.676, 69.963, 86.414, 112.608, 156.048, 231.587, 439.405" \
  );
  }
 }
 }
 }
 }
```

GENERATING ASSERTED SENSITIVITIES FOR STATISTICAL TIMING

BACKGROUND OF THE INVENTION

The present invention relates generally to the field of statistical timing analysis and more particularly to computing the expected timing of a digital circuit.

In integrated circuit design, timing closure is a complex issue. Static timing analysis (STA) is a method of computing the expected timing of a digital circuit without requiring simulation. High-performance integrated circuits have traditionally been characterized by the clock frequency at which they operate. Gauging the ability of a circuit to operate at the specified speed requires ability to measure, during the design process, its delay at numerous steps. Moreover, delay calculation must be incorporated into the inner loop of timing optimizers at various phases of design, such as logic synthesis, layout (placement and routing), optimizations performed late in the design cycle.

While such timing measurements can theoretically be performed using a rigorous circuit simulation, such an approach is liable to be too slow to be practical. Static timing analysis uses simplified delay models to provide a timely and reasonably accurate measurement of circuit timing. Static timing analysis also uses simplified delay models because of the ability of static timing analysis to consider the effects of logical interactions between signals is limited. Nevertheless, it has become a mainstay of circuit design over the last few decades.

SUMMARY

Embodiments of the present invention provide a method, system, and program product for generating asserted sensitivities. One or more processors group a plurality of timing arcs into a plurality of equivalence classes, wherein each timing arc includes one or more delay tables. One or more processors generate, for at least one equivalence class of the plurality of equivalence classes, an average sensitivity to a condition by performing a weighted average on respective sensitivities of timing arcs to the condition. One or more processors determine a sensitivity of an electronic circuit to the condition based, at least in part, on a match between one or more attributes of the electronic circuit and one or more attributes present in the at least one equivalence class.

DETAILED DESCRIPTION

Statistical static timing analysis (SSTA) is a procedure that is becoming increasingly necessary to handle the complexities of process and environmental variations in integrated circuits. Conventional static timing analysis (STA) has been a stock analysis algorithm for the design of digital circuits over 30 years. However, in recent years the increased variation in semiconductor devices and interconnect has introduced a number of issues that cannot be handled by traditional (deterministic) STA. This has led to considerable research into SSTA, which replaces the deterministic timing of gates and interconnects used with STA with probability distributions, and gives a distribution of possible circuit outcomes rather than a single outcome.

SSTA uses sensitivities to find correlations among delays. SSTA uses those correlations when computing how to add statistical distributions of delays. In general, the sensitivity of the circuit for a particular parameter represents the correlation between an amount of change in delay of the circuit and an amount of change in the parameter. In statistical static timing analysis, the determination of a sensitivity of a circuit toward a particular parameter is complicated due to variations in the integrated circuit manufacturing process and functional environments.

Two general approaches to determining the sensitivity of a digital circuit for a particular parameter are finite differencing and asserted sensitivity. Finite differencing is known to be computationally expensive. Asserted sensitivity is an efficient approach to determining sensitivities of a digital circuit at design time. However, it is difficult to determine what the value of the sensitivity should be when using asserted sensitivities, since there is always a tradeoff. This tradeoff is a result of the asserted sensitivity balancing the quality of a sensitivity that is determined against the computational efficiency required to determine that sensitivity. In other words, if using asserted sensitivities, an increase in quality of a determined sensitivity is accompanied by increase in computational expense.

For various reasons, it is not always practical to use a full set of multi-corner timing models in static timing. Examples include: transistor level timing—multi-corner simulation in this context is prohibitive; early optimization—the multiple recalculations required when significant changes are being made mean that every calculation (such as the finite differencing of multiple inverters) is costly.

Embodiments of the present invention provide asserted sensitivities of a circuit to a given condition that predict actual behavior of the circuit to that condition. Embodiments of the present invention recognize that asserted sensitivities of a circuit to a given condition that predict actual behavior of the circuit typically require simulating a large variety of intellectual property cores (IP cores) at many conditions—which is itself a computationally expensive simulation task. Embodiments of the present invention recognize that using the already characterized rules (e.g., .lib models) that represent an existing investment in simulation reduces some simulation cost for circuits.

Embodiments of the present invention provide grouping of circuit sensitivities to generate an averaged sensitivity. Embodiments of the present invention provide applying the averaged sensitivity to a circuit that is not included in the grouping. Embodiments of the present invention provide grouping the arcs of the group of circuits based on characteristics that are considered during the application of the sensitivity of a circuit to a given condition. Embodiments of the present invention provide performing a weighted average on circuit sensitivities of the grouping of circuit sensitivities to generate an averaged sensitivity of a type of circuit to a given condition. Embodiments of the present invention provide a reduction in computational expense when determining an asserted sensitivity of a circuit to a condition while increasing the quality of that asserted sensitivity to a condition.

The present invention will now be described in detail with reference to the Figures.

Figure 1:
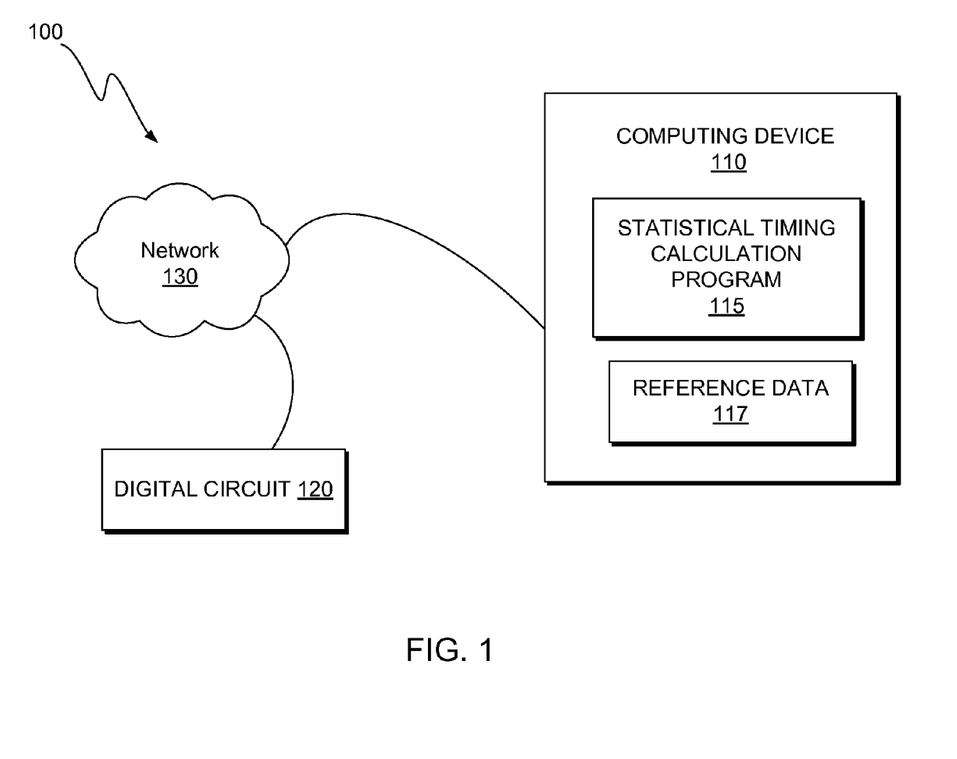
FIG. 1 is a functional block diagram illustrating a digital circuit production environment, in accordance with an exemplary embodiment of the present invention.

FIG. 1 is a functional block diagram illustrating digital circuit production environment, generally designated 100, in accordance with one embodiment of the present invention. Digital circuit production environment 100 includes computing device 110 and digital circuit 120 connected over network 130. Computing device 110 includes statistical timing calculation program 115 and reference data 117.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to statistical timing calculation program 115 and reference data 117 and is capable of executing statistical timing calculation program 115. Computing device 110 may include internal and external hardware components, as depicted and described in further detail with respect to FIG. 3.

In this exemplary embodiment, statistical timing calculation program 115 and reference data 117 are stored on computing device 110. However, in other embodiments, statistical timing calculation program 115 and reference data 117 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, digital circuit 120, statistical timing calculation program 115 and reference data 117, in accordance with a desired embodiment of the present invention.

In an embodiment, digital circuit 120 is a digital circuit that is being analyzed by statistical timing calculation program 115 to determine the sensitivity of digital circuit 120 for various parameters, e.g., conditions. In general, digital circuit 120 can be any electronic circuit, including an electronic circuit composed of individual electronic components, such as resistors, transistors, capacitors, inductors and diodes, connected by conductive wires or traces through which electric current can flow. In some embodiments, an electronic circuit is categorized as a mixed-signal circuit (a combination of analog circuits and digital circuits).

In an embodiment, statistical timing calculation program 115 generates groupings of sensitivities to conditions based on characteristics that will be considered during the application of those sensitivities. Such characteristics included, for example, rising and fallings delays for current and voltage, types of field-effect transistors (FETs) devices. Rising and fallings delays for current and voltage circuits that are either considered to be either p-Channel field-effect transistor (pFET) or n-Channel field-effect transistor (nFET) dominated. Types of FET devices include, for example, junction field-effect transistors (jFETs), metal-oxide-semiconductor field-effect transistor (MOSFET), dual-gate MOSFET (DGMOSFET), fast-reverse or fast-recovery epitaxial diode FET (FREDFET), and heterostructure insulated gate field-effect transistor (HIGFET), to name a few. In some embodiments, the groupings of sensitivities to a condition vary depending on one or both of the importance of a given sensitivity and what is expected to influence those sensitivities.

In this embodiment, statistical timing calculation program 115 applies a weighted average to the sensitivities to a condition included within a grouping. Such weighing is, for example, based on expected frequency in designs (example: function weighting by survey of previous designs), based on expected "criticality" of usage (example: weight high-speed inverters more), based on expected sensitivity to a condition to provide conservatism (example: weight lower voltage transformers more), or is uniform.

In an embodiment, reference data 117 includes a number of predefined sensitivities to a variety of conditions for various digital circuits and combinations thereof. In digital logic, an inverter includes at least one NOT gate. A NOT gate is a logic gate which implements logical negation. Inverters often include multiple NOT gates. Digital electronics circuits operate at fixed voltage levels corresponding to a logical 0 or 1 (i.e., binary). An inverter circuit, which includes one or more NOT gates, serves as the basic logic gate to swap between those two voltage levels. An inverter circuit takes one input signal and outputs a voltage representing the opposite logic-level to its input. In logic, there are usually two logical states, e.g., in binary there are two possible states, 0 and 1. If an inverter receives a 0 as input, then the inverter returns a 1 as output. Alternatively if the inverter receives a 1 as input, then the inverter returns a 0 as output. The inverter is often made of a discrete transistor with other components, or several inverters may be packaged in an integrated circuit. As such some inverters are considered to be "big" when compared to other inverters which are comparatively "small".

Digital inverter quality is often measured using the voltage transfer curve (VTC), which is a plot of output vs. input voltage. From such a graph, device parameters including noise tolerance, gain, and operating logic levels can be obtained. Ideally, the VTC appears as an inverted step function—this would indicate precise switching between on and off states—but in real devices, a gradual transition region exists. The VTC indicates that for low input voltage, the circuit outputs high voltage; for high input, the output tapers off towards the low level. The slope of this transition region is a measure of quality—steep (close to infinity) slopes yield precise switching.

In an embodiment, the number of predefined sensitivities for various digital circuits to various conditions and combinations thereof included in reference data 117 are generated based on a Fan-out of 4 (FO4) delay metric. FO4 is a process-independent delay metric used in digital complementary metal-oxide-semiconductor (CMOS) technologies. CMOS is a technology for constructing integrated circuits. CMOS technology is used in microprocessors, microcontrollers, static random access memory (RAM), and other digital logic circuits. As a delay metric, one FO4 is the delay of an inverter, driven by an inverter 4 times smaller than itself, and driving an inverter that is 4 times larger than itself. For example, an inverter A includes four NOT gates, as such, to determine the delay using FO4, inverter A is driven by a single NOT gate and drives sixteen NOT gates. Both conditions are necessary since input signal rise and fall time affects the delay as well as output loading. An FO4 is the answer to the canonical problem stated as follows: given a fixed size inverter, small in comparison to a fixed large load, what is the minimum delay in driving the large load.

Because scaled technologies are inherently faster (in absolute terms), circuit performance can be more fairly compared using the FO4 as a metric. For example, given two 64-bit adders, one implemented in a 0.5 um technology and the other in 90 nm technology, it would be unfair to say the 90 nm adder is better from a circuits and architecture standpoint just because it has less latency. The 90 nm adder might be faster only due to its inherently faster devices. As such, in one embodiment, to compare the adder architecture and circuit design, statistical timing calculation program 115 normalizes each adder's latency to the delay of one FO4 inverter.

Figure 2:
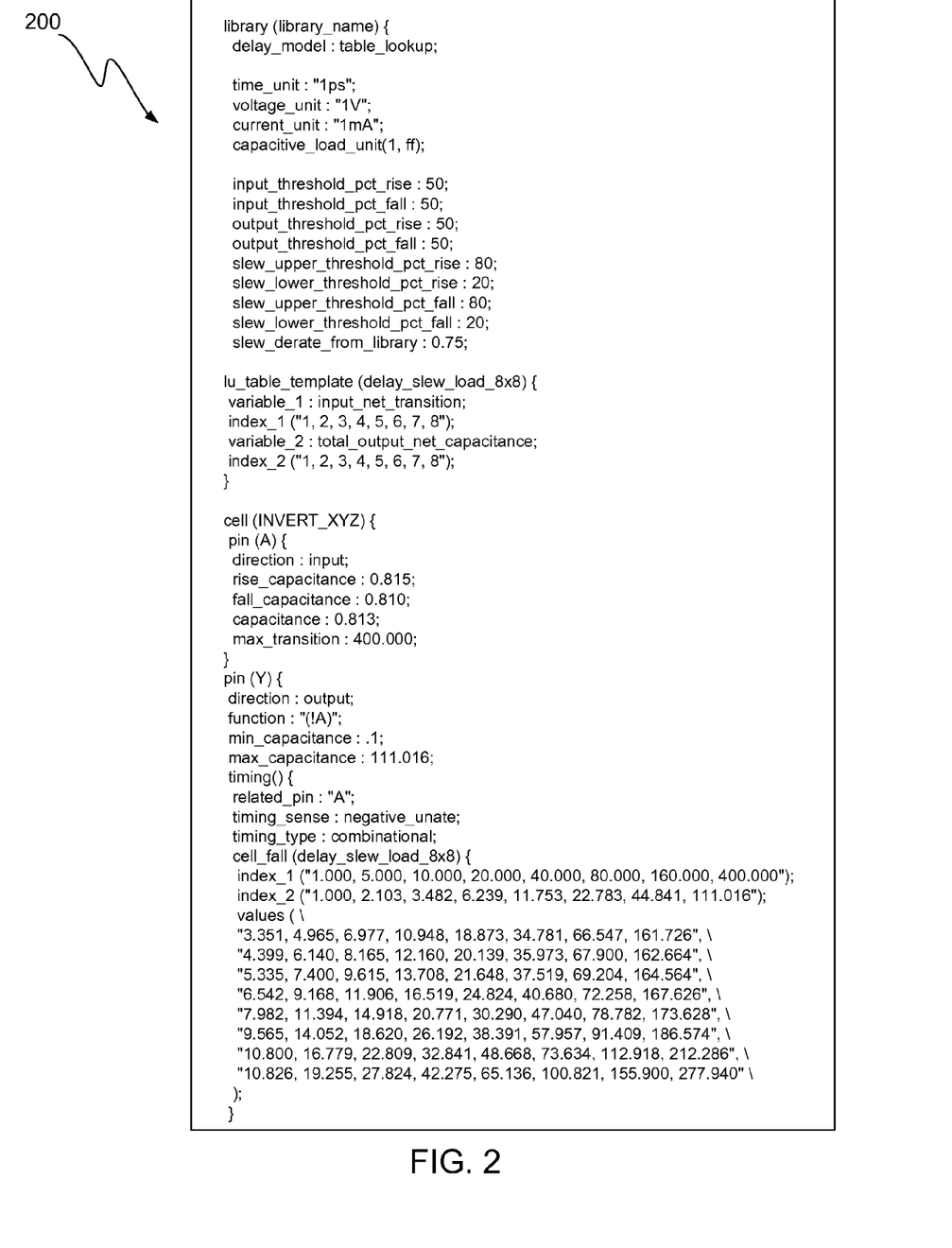
FIG. 2 illustrates a first part of an example of data included in a timing rule, in accordance with an exemplary embodiment of the present invention.
Figure 3:
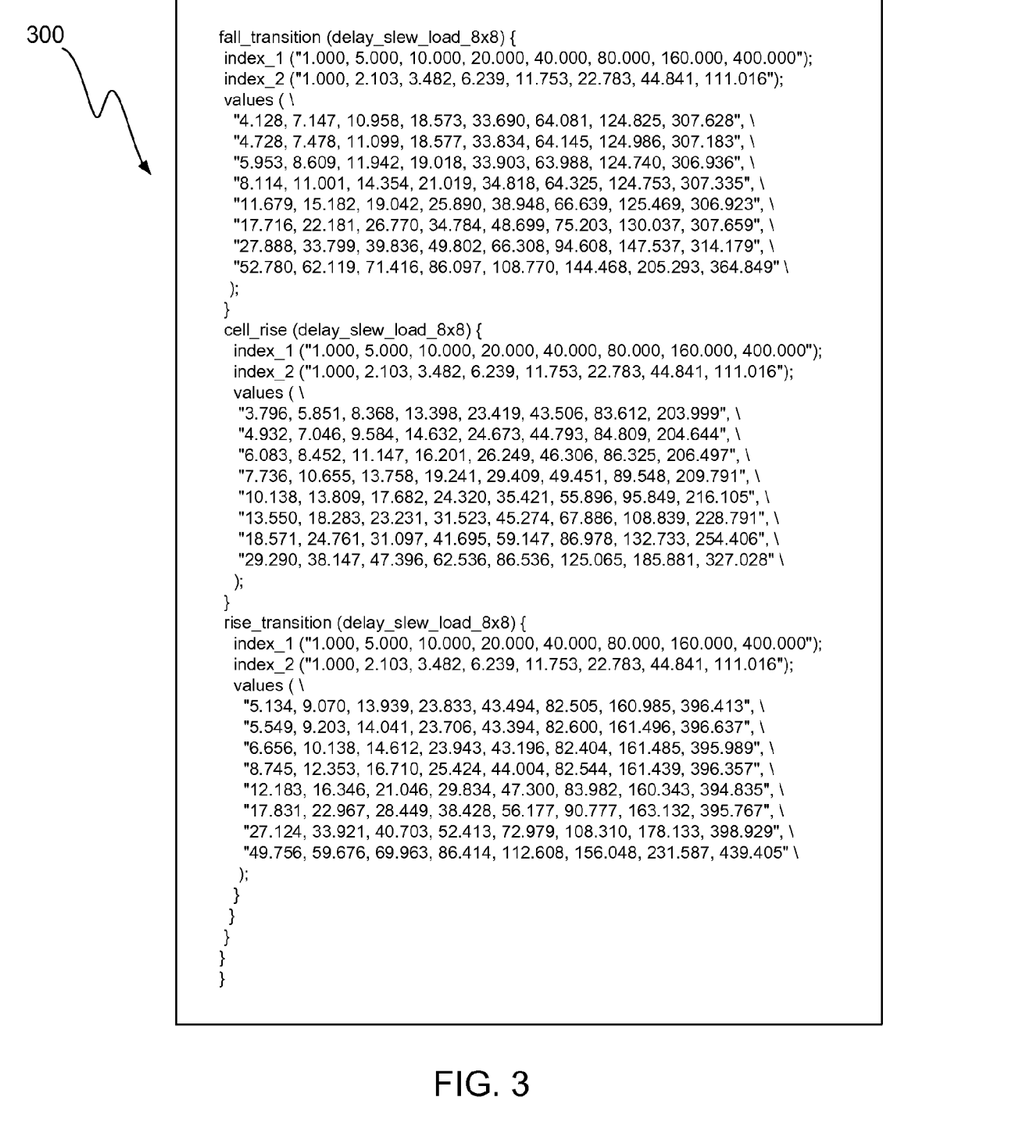
FIG. 3 illustrates a second part of an example of data included in a timing rule, in accordance with an exemplary embodiment of the present invention.
Figure 4:
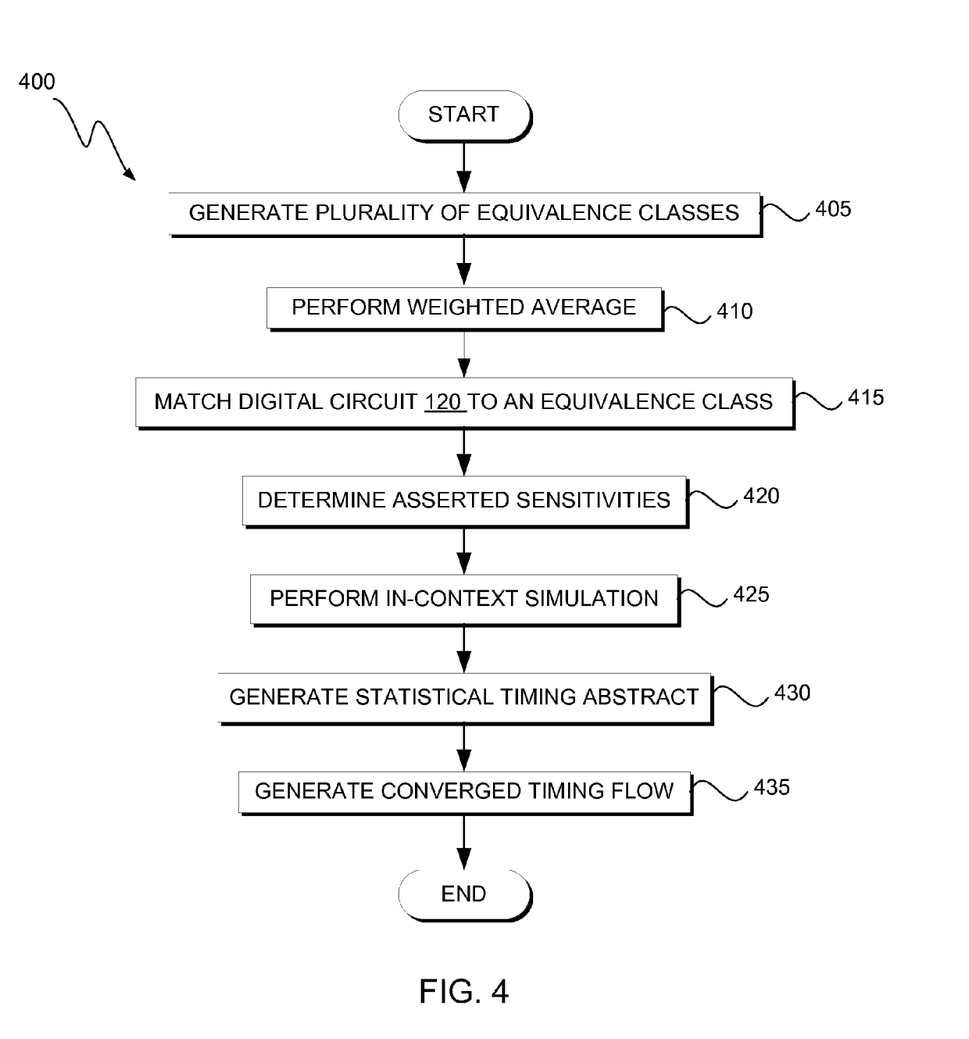
FIG. 4 illustrates operational processes of a statistical timing calculation program, on a computing device within the environment of FIG. 1, in accordance with an exemplary embodiment of the present invention.

In the embodiments described hereafter, such as in the discussion of FIGS. 2, 3 and 4, the FO4 being used deviates from the previous description. In the discussion of FIGS. 2, 3 and 4, the FO4 represents an output load that is calculated by taking an input capacitance, which is the load that a gate presents on a net, and multiplying by a constant, in this case 4. For example, a gate has a capacitance of 0.813 femto Farads (ff). Therefore the output load is 4 times 0.813 ff, which is 3.252 ff. In the discussion of FIG. 2, such an FO4 value represents a "reasonable" load assumption that is applied for the purposes of data mining. Such a value is calculated for every arc, not just once for the technology.

In an embodiment, reference data 117 includes a) a number of timing rules and b) predefined sensitivities to various conditions for various digital circuits and combinations thereof. In general a timing rule is a text file in an industry standard format that represents timing data for one cell at one combination of process/voltage/temperature. FIGS. 2 and 3 respectively illustrate a first part, 200, and a second part, 300, of an example of data included in a timing rule, in accordance with an exemplary embodiment of the present invention.

As seen in first part 200, the text file of the timing rule begins with four blocks of generic library information, then has a block that starts "cell (INVERT_XYZ) {". The first line of this fifth block denotes that the data is for the cell named INVERT_XYZ. Nested below that first line there are two blocks, one that is "pin (A) {" which is the input pin, and one that is "pin (Y) { . . . ", which is the output pin. In this format, the input pin (A) includes information about input capacitance for the cell, and the output pin includes information about timing arcs of the output of the cell. As seen in first part 200 and second part 300, each timing arc is defined by a section with a beginning line labelled "timing( ) {". Inside of each timing arc sections, the pin of origin (always A in this case) is identified and information about the edge direction on the arcs is specified. In this specific case, in first part 200, the following is seen:

pin (Y)
direction: output;
timing( ) {
related_pin: "A";
timing_sense: negative_unate;
timing_type: combinational;

In this case, "negative_unate" means an inverting edge, so this is two arcs, A rise to Y fall, and A fall to Y rise, which is what is expected from an inverter. Inside the timing( ) block there are four tables: cell_fall, fall_transition, cell_rise, and rise_transition. Cell_fall is shown in first part 200 and fall_transition, cell_rise, and rise_transition are shown in second part 300. All of these are two dimensional tables, with rows indexed by slew at pin A, and columns indexed by load (capacitance) at pin Y. Cell_fall and cell_rise are delay tables, where the values are delays (in picoseconds, ps) from pin A to pin Y (_fall/_rise is the transition direction at pin Y), and fall_transition and rise_transition are slew tables (also in picoseconds, ps), where the values are slew at pin Y (fall_/rise_ are transition direction at pin Y). To calculate a value for input slew/output loads that are not in the index list, statistical timing calculation program 115 interpolates other values based on values included in the table.

Statistical timing calculation program 115 calculate a single output load by taking the input capacitance and multiplying by a constant, for example, an input capacitance multiplied by 4. In continuation with the previous example, 0.813 ff*4=3.252 ff. Statistical timing calculation program 115 uses 3.252 ff as the column index, and treats the delay/slew tables as one dimensional tables, indexed by slew at pin A. Notice that, in both first part 200 and second part 300, these values are slightly smaller than the third column in each of the tables, which is indexed by 3.482 ff. Below, in Table 1, all tables are indexed by the following slews measured in pico-seconds (ps) at pin A: 1.000 ps, 5.000 ps, 10.000 ps, 20.000 ps, 40.000 ps, 80.000 ps, 160.000 ps, 400.000 ps.

TABLE 1

|  | rise_transition (at 3.252ff) | cell_rise (at 3.252ff) | fall_transition (at 3.252ff) | cell_fall (at 3.252ff) |
| --- | --- | --- | --- | --- |
| 1.000 | 13.12 | 7.94 | 10.32 | 6.64 |
| 5.000 | 13.23 | 9.16 | 10.49 | 7.82 |
| 10.000 | 13.86 | 10.69 | 11.38 | 9.24 |
| 20.000 | 15.98 | 13.24 | 13.79 | 11.45 |
| 40.000 | 20.26 | 17.03 | 18.39 | 14.33 |
| 80.000 | 27.53 | 22.4 | 26 | 17.85 |
| 160.000 | 39.56 | 30.03 | 38.82 | 21.79 |
| 400.000 | 68.23 | 45.84 | 69.85 | 26.38 |

Statistical timing calculation program 115 calculates equilibrium slews. Equilibrium slews are a pair of slews (also called a load slew pair), wherein one is rising and one is falling, such that the rise-transition table, when given the falling slew, gives back the rising slew, and the fall-transition table, when given the rising slew, gives back the falling slew. In the above example, these slews are determined by statistical timing calculation program 115 to be 12.44 ps falling and 14.37 ps rising. Notice that these values are between the 3rd and 4th entries in the respective tables, which are indexed by lops and 20 ps slews respectively. In general, the table is determined by statistical timing calculation program 115 to belong to at least one equivalence class of an electronic circuit. As such, statistical timing calculation program 115 determines a rise and fall output slew of the electronic circuit by identifying an output slew of a delay table of a timing arc included in the equivalence class that, when applied to the input of the other delay table, results in the original output slew at the single output load previously calculated.

Statistical timing calculation program 115 uses the determined equilibrium slews to compute a delay for each arc. The delay for each arc is determined by Statistical timing calculation program 115 based, at least in part, on the data included in the table and the determined equilibrium slews, i.e., 12.44 ps falling and 14.37 ps rising. As such, statistical timing calculation program 115 uses rising slew of 14.37 ps to determine a rise to fall transition (cell_fall) of 10.21 ps. Statistical timing calculation program 115 uses falling slew of 12.44 ps to determine a fall to rise transition (cell_rise) of 11.31 ps. Again in this example, these are interpolations between the 3rd and 4th entries in the delay tables that represent the delays at 10 ps and 20 ps input slews. The determined delays for the arcs are the delay values for those arcs at this particular set of conditions, which, in this example, are indicated by the data included in the first four blocks of the table of first part 200 of the timing rule.

Statistical timing calculation program 115 completes the procedure by repeating such calculations for all arcs and for all of the conditions of interest. Statistical timing calculation program 115 also performs averaging and differencing across conditions to get mean and sensitivities by arc, then normalizes those sensitivities to a fraction of the mean and average that value across the arcs.

Statistical timing calculation program 115 generates predefined sensitivities to a variety of conditions for various digital circuits and combinations thereof, using a number of steps shown in Table 2 below:

TABLE 2

1) For each gate to be used in the setup, determine a "characteristic" delay at each condition using the FO4 metric
Accounts for reasonable loading on varying size books
Bakes slew effect into pvt impacts
Note: for Random/Systematic, use slew at base (no slew baking)
2) Associate each condition with a coordinate in the sigma space
for some conditions this will be known/specified (e.g. max voltage = +3, min voltage = −1)
For some conditions this will be an unknown (e.g. an intermediate voltage)
3) Compute other condition values by successive averaging
4) Compute base sensitivities by differencing values at compatible conditions
5) Compute cross terms differencing values and projections at compatible conditions
6) Compute sigmas for unknown conditions by solving for projection
7) Normalize sensitivies and cross terms to mean value In some scenarios, designers of a circuit desire to qualify their design across many conditions. Behavior of an electronic circuit is often dependent on various factors in its environment like temperature or local voltage variations. In such a case, either STA needs to be performed for more than one such set of conditions, or STA must be prepared to work with a range of possible delays for each component, as opposed to a single value. If the design works at each extreme condition, then under the assumption of monotonic behavior, the design is also qualified for all intermediate points.

In static timing analysis, the use of corners is common. A corner can be, in general, defined as a collection of three conditions that are being considered during design of the circuit. For example, in a "best" case corner the conditions are set as follows: fast process, highest voltage and lowest temperature. In another example, in a "worst" case design corner the conditions are set as follows: slow process, lowest voltage and highest temperature. In some scenarios, such combinations of conditions are overly optimistic. For example, the corner assumes perfect tracking between all gates in terms of performance. Therefore, if one gate is fast, then all gates are assumed fast, or if the voltage is low for one gate, then the voltage is low for all others. In other situations corners are overly pessimistic. In some scenarios the "worst" case corner seldom occurs. For example, in an integrated circuit, for example, it is known to have one metal layer at the thin or thick end of its allowed range, but it is rare for all 10 layers to be at the same limit, since they are manufactured independently.

In some embodiments, reference data 117 includes a library of delays and their respective tracking with conditions as well as delay distributions with their respective correlations to changes in a variable, as calculated using either STA and SSTA approaches. In general, each delay arc has respective sigma values where units are represented as a change per sigma (a change of scale as is known to those skilled in the art), a bases sensitivity for that delay arc given a particular condition, and cross terms, all of which are based on one or more canonical models. This collection of values for a given circuit is herein referred to as a "book".

A sigma ($\sigma$) at a given condition is found by locating delay on a linear scale. In general, delay is a linear function of sigma, by definition, herein called delay-sigma function with an x-axis representing amounts of sigma and a y-axis representing amounts of delay. However, delay is a non-linear function of voltage, herein called a delay-voltage function with an x-axis representing amounts of voltage and a y-axis representing amounts of delay. As such, sigma units create a linear delay function. Sigma units themselves are defined by end-point conditions. For example, the points where the delay-sigma function and delay-voltage function intersect when graphed concurrently. The average value of the variable, in this case delay, between the two intersecting points is defined as the zero sigma value. As such, a sigma at a given condition, say a value of voltage on a delay-voltage function is found by locating the same delay on the delay-sigma function and identifying the corresponding sigma value. In other words, if a delay-voltage function uses coordinates X, Y for a point on the graph of the function, then X represents the amount of voltage and Y represents the amount of delay. To find the corresponding sigma at that condition, the graph of the delay-sigma function is assessed and a point Z, Y is located, where Y represents the amount of delay, which is the same value of delay of point X, Y, and a corresponding sigma value with the amount of Z.

In general, the sensitivity of the circuit for a variable (a type of condition), such as voltage, is defined as a change in delay between zero sigma and one sigma units. Delay is often very sensitive to voltage. In addition, changes in other conditions often correlate with changes in voltage. For example, uncorrelated conditions, such as process-chip variation (PCV) and across-chip variation (ACV) effects, are much larger at lower voltages than high voltages. Moreover, temperature inverts some correlations at high and low voltages. Cross terms are used to represent such effects.

If two conditions have coordinates $<\sigma_1, \ldots, \sigma_i, \ldots, \sigma_n>$ and $<\sigma_1, \ldots, -\sigma_i, \ldots, \sigma_n>$, then $<\sigma_i, \ldots, 0, \ldots, \sigma_n>$ is the average of the values at these two conditions. If you have enough complementary conditions, you can successively average values to achieve the mean $<0, 0, \ldots, 0>$ The general formula for projecting with two variable cross terms consists of:

$$V\vec{\sigma} = \text{mean} + \sum_i S_i \sigma_i + \sum_{i,j} X_{i,j} \sigma_i \sigma_j$$

So if $\vec{\sigma}, \vec{\sigma}'$ are such that:
$\sigma_j = \sigma'_j$ for all $j \neq i$
then $$V\vec{\sigma} - V\vec{\sigma}' = S_i \sigma_i - S_i \sigma'_i + \Sigma_j X_{i,j} (\sigma_i - \sigma'_i) \sigma_j$$

If we assume that $X_{i,j} = 0$ for all j s.t. $\sigma_j \neq 0$ (i.e. no cross terms) then:

$$S_i = \frac{V\vec{\sigma} - V\vec{\sigma'}}{\sigma_i - \sigma'_i}$$

To compute cross terms:

$$V\vec{\sigma} = \text{mean} + \sum_i S_i \sigma_i + \sum_{i,j} X_{i,j} \sigma_i \sigma_j$$

Where $$V\vec{\sigma}' = \text{mean} + \Sigma_i S_i \sigma'_i + \Sigma_{i,j} X_{i,j} \sigma'_i \sigma'_j$$

If for all $k \neq j, i$ $\sigma_k = \sigma'_k$ then:

$$V\vec{\sigma} - V\vec{\sigma'} = S_i(\sigma_i - \sigma'_i) + S_j(\sigma_j - \sigma'_j) +$$
$$\sum_{i,k} X_{i,k}(\sigma_i - \sigma'_i)\sigma_k + \sum_{j,k} X_{j,k}(\sigma_j - \sigma'_j)\sigma_k + X_{i,j}(\sigma_i \sigma_j - \sigma'_i \sigma'_j)$$

If for all $k \neq j, i$, $X_{[ij],k}$ are known, assumed 0, or $\sigma_k = 0$, then solve:

$$X_{i,j} = \frac{V\vec{\sigma} - V\vec{\sigma'} - S_i(\sigma_i - \sigma'_i) - S_j(\sigma_j - \sigma'_j) - \text{known cross terms}}{\sigma_i \sigma_j - \sigma'_i \sigma'_j}$$

As such, for each delay arc of a book we have: a) σ, the computed sigma values for any unknown conditions; b) S, the base sensitivity of that delay arc to a given condition; and c) X, the cross terms [some assumed 0 based on available data]. Each of S and X are adders to the mean value per sigma. The magnitude of these values depends strongly on base delay, which varies from book to book and depending on applied load and slew.

These values are normalized to be a fraction of the mean, e.g., a value at:

$\vec{\sigma}_0$, s.t $\sigma_i = 0$ for all i

For some sensitivities to specific conditions, such as random (dopant), the variation is expected to be a non-linear function of other properties of the circuit (e.g. driving FET width) and these are further normalized by applying the inverse function.

Given the data included in reference data 117, provided that all books have been characterized, this data can be used by statistical timing calculation program 115 to reduce the cost of on-the-fly finite differencing in timing or optimization flows, with the primary loss of information being load and slew dependence on sensitivities. In this embodiment, for sensitivities that are functions of other circuit properties, statistical timing calculation program 115 de-normalizes a percent sensitivity by applying a function to the sensitivities, and then multiplies the computed sensitivities for the equivalence class by the computed mean delay of the equivalence class.

In an embodiment, the data included in reference data 117 includes combined book-sensitivities that form equivalence classes. Statistical timing calculation program 115 forms these equivalence classes by grouping the arcs by characteristics that will be considered during the application of the sensitivities. Statistical timing calculation program 115 uses the equivalence classes to provide higher level sensitivity groupings and applies them to circuits not in the set for which the above calculations were performed. This process is further described in FIG. 2.

FIG. 4 illustrates a flow diagram, 400, of the operational processes of statistical timing calculation program 115, executing on computing device 110 within the environment of FIG. 1, in accordance with an exemplary embodiment of the present invention.

In general, FIG. 4 illustrates how, in one embodiment, statistical timing calculation program 115 generated assertions (including equivalence classes and average sensitivities of the equivalence class to a condition(s)) for a set of digital circuits and applies those generated assertions to a timing analysis of a digital circuit not included in the set.

In step 405 statistical timing calculation program 115 generates a plurality of equivalence classes.

In step 410, statistical timing calculation program 115 performs a weighted average to the books included in the respective equivalence classes to generate averaged values for the characteristics included in those books.

In step 415, statistical timing calculation program 115 matches digital circuit 120 to an equivalence class. Statistical timing calculation program 115 matches digital circuit 120 to an equivalence class by selecting and matching one of the average sensitivities of the equivalence class to one or more conditions (e.g., attributes) of digital circuit 120.

In step 420, statistical timing calculation program 115 determines the asserted sensitivities to a variety of conditions for digital circuit 120. Statistical timing calculation program 115 determines the asserted sensitivities based, at least in part, on the matching equivalence class, and associates those asserted sensitivities with digital circuit 120, i.e., associates the expected variation in timing to digital circuit 120.

In step 425, statistical timing calculation program 115 performs a single in-context simulation of digital circuit 120. In some scenarios, statistical timing calculation program 115 determines what conditions will likely be encountered if the digital circuit were deployed in a given environment, and performs a simulation of digital circuit 120 under those conditions. In other scenarios, the conditions under which statistical timing calculation program 115 performs a simulation of digital circuit 120 are varied to predict the performance of digital circuit 120 under adverse conditions that are not expected to be encountered by digital circuit 120. The simulation yields an estimated delay for digital circuit 120. In some embodiments, statistical timing calculation program 115 performs a single simulation at a "starting" corner (e.g., either the mean or a known sigma offset). In some embodiments, if the starting corner is not mean, then statistical timing calculation program 115 computes a mean delay by applying the inverse of the projection formula, as explained previously.

In step 430, statistical timing calculation program 115 mathematically combines the simulation results of digital circuit 120 with the asserted sensitivities to various conditions, thereby generating a statistical timing abstract for digital circuit 120. In this embodiment, to compute sensitivities for a digital circuit being analyzed, statistical timing calculation program 115 multiplies computed sensitivities for a given equivalence class (which are a fraction of mean) by a computed mean delay of digital circuit 120. In this embodiment, for sensitivities which are functions of other circuit properties (as discussed in paragraph 51), statistical timing calculation program 115 de-normalizes a percent sensitivity by applying a function, and then multiplies the computed sensitivities for the equivalence class by the computed mean delay of digital circuit 120. Statistical timing calculation program 115 uses these computed arc specific sensitivities to compute the statistical timing abstract for digital circuit 120.

In step 435, statistical timing calculation program 115 uses the statistical timing abstract of digital circuit 120 to generate a converged timing flow for digital circuit 120. In some embodiments, statistical timing calculation program 115 uses the statistical timing abstract to generate a timing model of the design of digital circuit 120. In some embodiments, statistical timing calculation program 115 uses such a timing model of the design of digital circuit 120 in other statistical timing determinations that include other methods of computing sensitivities for other circuits.

Figure 5:
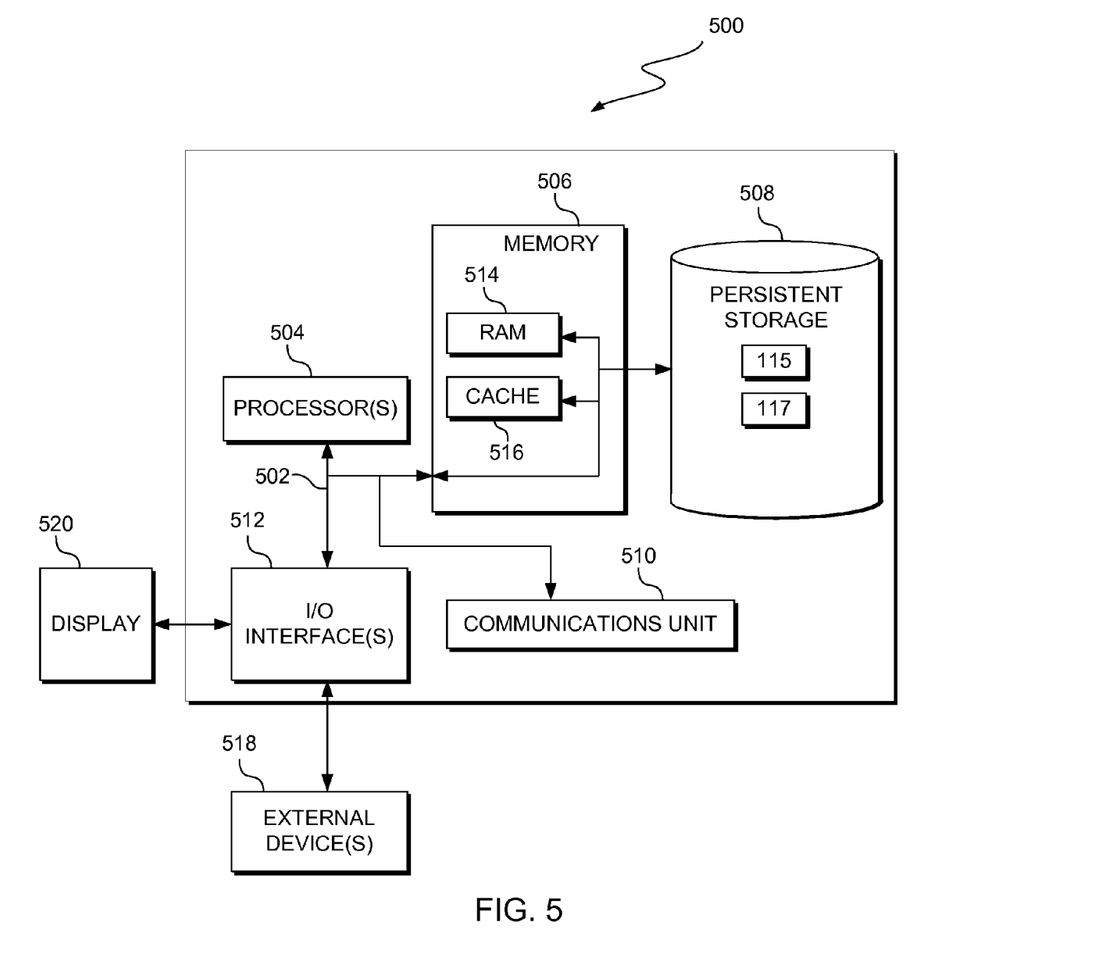
FIG. 5 depicts a block diagram of components of the computing device executing the statistical timing calculation program, in accordance with an exemplary embodiment of the present invention.

FIG. 5 depicts a block diagram, 500, of components of computing device 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Statistical timing calculation program 115 and reference data 117 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. Statistical timing calculation program 115 and reference data 117 may be downloaded to persistent storage 508 through communications unit 510.

I/O interface(s) 512 allows for input and output of data with other devices that may be connected to computing device 110, such as digital circuit 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., statistical timing calculation program 115 and reference data 117, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of generating asserted sensitivities comprising:
    grouping, by one or more processors, a plurality of timing arcs of a plurality of tested circuits into a plurality of equivalence classes such that a given equivalence class is associated with one or more characteristics of one or both of the plurality of tested circuits and the plurality of timing arcs that are included in that given equivalence class, wherein each timing arc includes one or more delay tables;
    generating, by the one or more processors, for at least one equivalence class of the plurality of equivalence classes, an average sensitivity to an operational condition by performing a weighted average on respective sensitivities of timing arcs to the operational condition;
    matching, by the one or more processors, an electronic circuit to the at least one equivalence class based, at least in part, on a characteristic of the electronic circuit that matches a characteristic associated with the at least one equivalence class; and
    determining, by the one or more processors, a sensitivity of the electronic circuit to the operational condition based, at least in part, on i) a match between the characteristic of the electronic circuit and the characteristic that is associated with the at least one equivalence class and ii) the average sensitivity.

2. The method of claim 1, wherein the step of grouping, by one or more processors, a plurality of timing arcs of tested circuits into a plurality of equivalence classes further comprises:
    loading, by the one or more processors, one or more timing rules; and
    identifying, by the one or more processors, one or more timing arcs within the one or more timing rules.

3. The method of claim 1, the method further comprising:
    calculating, by the one or more processors, a first output load by multiplying an input capacitance by a constant.

4. The method of claim 1, the method further comprising:
determining, by the one or more processors, a rise and fall output slew of the electronic circuit by identifying a first output slew of a first delay table of a first timing arc included in the at least one equivalence class that, when applied to the input of a second delay table, results in the first output slew at a second output load.

5. The method of claim 1, the method further comprising:
calculating, by the one or more processors, for a second timing arc and the operational condition, a representative delay from a second delay table by using a calculated load slew pair.

6. The method of claim 1, the method further comprising:
computing, by the one or more processors, for one or more timing arcs, a mean delay and change in sensitivity in each operational condition and cross terms for the respective one or more timing arcs; and
normalizing, by the one or more processors, the respective sensitivity of the one or more timing arcs by dividing the respective sensitivity of the one or more timing arcs by the mean delay of the one or more timing arcs.

7. The method of claim 1, the method further comprising:
generating, by the one or more processors, a statistical timing abstract for the electronic circuit by mathematically combining a result of a simulation of the electronic circuit with an asserted sensitivity of the electronic circuit to the operational condition.

8. A computer program product for generating asserted sensitivities, the computer program product comprising:
one or more computer-readable storage media and program instructions stored on the one or more computer-readable storage media, the program instructions comprising:
program instructions to group a plurality of timing arcs of a plurality of tested circuits into a plurality of equivalence classes such that a given equivalence class is associated with one or more characteristics of one or both of the plurality of tested circuits and the plurality of timing arcs that are included in that given equivalence class, wherein each timing arc includes one or more delay tables;
program instructions to generate, for at least one equivalence class of the plurality of equivalence classes, an average sensitivity to an operational condition by performing a weighted average on respective sensitivities of timing arcs to the operational condition;
program instructions to match an electronic circuit to the at least one equivalence class based, at least in part, on a characteristic of the electronic circuit that matches a characteristic associated with the at least one equivalence class; and
program instructions to determine a sensitivity of the electronic circuit to the operational condition based, at least in part, on i) a match between the characteristic of the electronic circuit and the characteristic that is associated with the at least one equivalence class and ii) the average sensitivity.

9. The computer program product of claim 8, wherein the program instructions to group a plurality of timing arcs of tested circuits into a plurality of equivalence classes further comprises:
program instructions to load one or more timing rules; and
program instructions to identify one or more timing arcs within the one or more timing rules.

10. The computer program product of claim 8, the program instructions further comprising:
program instructions to calculate a first output load by multiplying an input capacitance by a constant.

11. The computer program product of claim 8, the program instructions further comprising:
program instructions to determine a rise and fall output slew of the electronic circuit by identifying a first output slew of a first delay table of a first timing arc included in the at least one equivalence class that, when applied to the input of a second delay table, results in the first output slew at a second output load.

12. The computer program product of claim 8, the program instructions further comprising:
program instructions to calculate for a second timing arc and the operational condition, a representative delay from a second delay table by using a calculated load slew pair.

13. The computer program product of claim 8, the program instructions further comprising:
program instructions to compute, for one or more timing arcs, a mean delay and change in sensitivity in each operational condition and cross terms for the respective one or more timing arcs; and
program instructions to normalize the respective sensitivity of the one or more timing arcs by dividing the respective sensitivity of the one or more timing arcs by the mean delay of the one or more timing arcs.

14. The computer program product of claim 8, the program instructions further comprising:
program instructions to generate a statistical timing abstract for the electronic circuit by mathematically combining a result of a simulation of the electronic circuit with an asserted sensitivity of the electronic circuit to the operational condition.

15. A computer system for generating asserted sensitivities, the computer system comprising:
one or more computer processors;
one or more computer readable storage medium;
program instructions stored on the computer readable storage medium for execution by at least one of the one or more processors, the program instructions comprising:
program instructions to group a plurality of timing arcs of a plurality of tested circuits into a plurality of equivalence classes such that a given equivalence class is associated with one or more characteristics of one or both of the plurality of tested circuits and the plurality of timing arcs that are included in that given equivalence class, wherein each timing arc includes one or more delay tables;
program instructions to generate, for at least one equivalence class of the plurality of equivalence classes, an average sensitivity to an operational condition by performing a weighted average on respective sensitivities of timing arcs to the operational condition;
program instructions to match an electronic circuit to the at least one equivalence class based, at least in part, on a characteristic of the electronic circuit that matches a characteristic associated with the at least one equivalence class; and
program instructions to determine a sensitivity of the electronic circuit to the operational condition based, at least in part, on i) a match between the characteristic of the electronic circuit and the characteristic that is associated with the at least one equivalence class and ii) the average sensitivity.

16. The computer system of claim 15, wherein the program instructions to group a plurality of timing arcs of tested circuits into a plurality of equivalence classes further comprises:

program instructions to load one or more timing rules; and program instructions to identify one or more timing arcs within the one or more timing rules.

17. The computer system of claim 15, the program instructions further comprising:

program instructions to calculate a first output load by multiplying an input capacitance by a constant.

18. The computer system of claim 15, the program instructions further comprising:

program instructions to determine a rise and fall output slew of the electronic circuit by identifying a first output slew of a first delay table of a first timing arc included in the at least one equivalence class that, when applied to the input of a second delay table, results in the first output slew at a second output load.

19. The computer system of claim 15, the program instructions further comprising:

program instructions to calculate for a second timing arc and the operational condition, a representative delay from a second delay table by using a calculated load slew pair.

20. The computer system of claim 15, the program instructions further comprising:

program instructions to compute, for one or more timing arcs, a mean delay and change in sensitivity in each operational condition and cross terms for the respective one or more timing arcs; and program instructions to normalize the respective sensitivity of the one or more timing arcs by dividing the respective sensitivity of the one or more timing arcs by the mean delay of the one or more timing arcs.

* * * * *